(12) United States Patent
Arnold

(10) Patent No.: US 8,097,057 B2
(45) Date of Patent: Jan. 17, 2012

(54) PARTICLE SEPARATOR

(75) Inventor: Adrian Christopher Arnold, Brentor (GB)

(73) Assignee: Euro-Pro Operating LLC, Newton, MA (US)

( * ) Notice: Subject to any disclaimer, the term of this patent is extended or adjusted under 35 U.S.C. 154(b) by 327 days.

(21) Appl. No.: 12/293,975

(22) PCT Filed: Mar. 21, 2007

(86) PCT No.: PCT/GB2007/000980
§ 371 (c)(1),
(2), (4) Date: Sep. 22, 2008

(87) PCT Pub. No.: WO2007/107740
PCT Pub. Date: Sep. 27, 2007

(65) Prior Publication Data
US 2009/0158932 A1    Jun. 25, 2009

(30) Foreign Application Priority Data

Mar. 23, 2006 (GB) .................................. 0605866.3
Jul. 24, 2006 (GB) .................................. 0614681.5

(51) Int. Cl.
*B01D 45/12* (2006.01)
(52) U.S. Cl. ............. 55/459.1; 55/426; 55/428; 55/337; 55/345; 55/343; 55/346; 55/424; 55/DIG. 3
(58) Field of Classification Search .................. 55/459.1, 55/426, 428, 337, 345, 343, 346, 424, DIG. 3; 15/353, 352; 95/267–272
See application file for complete search history.

(56) References Cited

U.S. PATENT DOCUMENTS

| | | | |
|---|---|---|---|
| 2,580,317 A | 12/1951 | Pekar et al. | |
| 2,726,767 A | 12/1955 | Rakowsky | |
| 3,320,727 A | 5/1967 | Farley et al. | |
| 3,957,471 A | 5/1976 | Yoshihiro et al. | |
| 5,078,761 A | 1/1992 | Dyson | |
| 6,350,292 B1 * | 2/2002 | Lee et al. | 55/459.1 |
| 6,406,505 B1 * | 6/2002 | Oh et al. | 55/337 |

(Continued)

FOREIGN PATENT DOCUMENTS

DE    729 104 C    12/1942

(Continued)

OTHER PUBLICATIONS

Office Action for Japanese Application No. 2009-500915 mailed Mar. 30, 2011.

(Continued)

*Primary Examiner* — Jason M Greene
*Assistant Examiner* — Dung H Bui
(74) *Attorney, Agent, or Firm* — Wolf, Greenfield & Sacks, P.C.

(57) ABSTRACT

Apparatus for separation of particles from a fluid stream entraining said particles comprises an inlet zone, a centrifugal separation zone, particles collection means and exhaust means, in which the inlet and separation zones are in communication via a transition zone for inducing vortical flow in the fluid stream, the transition zone having a diameter greater than the diameter of the inlet zone and comprising means defining an outlet port to the separation zone, an entry port being formed in the transition zone upstream of the baffle means, the entry and outlet ports being mutually arranged to minimise fluid perturbation in the fluid stream in use.

20 Claims, 7 Drawing Sheets

U.S. PATENT DOCUMENTS

| | | | |
|---|---|---|---|
| 6,572,668 B1 * | 6/2003 | An et al. | 55/428 |
| 6,588,055 B2 | 7/2003 | Bair et al. | |
| 6,679,930 B1 * | 1/2004 | An et al. | 55/337 |
| 6,829,804 B2 | 12/2004 | Sepke | |
| 6,896,719 B2 | 5/2005 | Coates et al. | |
| 7,162,770 B2 | 1/2007 | Davidshofer | |
| 7,422,615 B2 | 9/2008 | Kim | |
| 7,547,351 B2 | 6/2009 | Oh et al. | |
| 7,559,964 B2 | 7/2009 | Oh et al. | |
| 7,615,089 B2 | 11/2009 | Oh | |
| 7,637,973 B2 | 12/2009 | Oh et al. | |
| 7,708,791 B2 | 5/2010 | Oh et al. | |
| 7,744,667 B2 | 6/2010 | Oh et al. | |
| 7,780,752 B2 | 8/2010 | Cha et al. | |
| 7,785,381 B2 | 8/2010 | Oh et al. | |
| 7,794,515 B2 | 9/2010 | Oh et al. | |
| 7,803,205 B2 | 9/2010 | Oh et al. | |
| 7,854,779 B2 | 12/2010 | Oh | |
| 2002/0178701 A1 | 12/2002 | Oh et al. | |
| 2003/0221277 A1 | 12/2003 | Oh et al. | |
| 2004/0103786 A1 | 6/2004 | Hiltunen et al. | |
| 2005/0252179 A1 | 11/2005 | Oh et al. | |
| 2007/0079587 A1 | 4/2007 | Kim | |
| 2008/0047091 A1 | 2/2008 | Nguyen | |
| 2009/0165431 A1 | 7/2009 | Oh | |
| 2009/0178378 A1 | 7/2009 | Bertram et al. | |
| 2009/0205162 A1 | 8/2009 | Oh et al. | |
| 2009/0217635 A1 | 9/2009 | Bertram et al. | |
| 2010/0024367 A1 | 2/2010 | Howes | |
| 2010/0162517 A1 | 7/2010 | Han et al. | |
| 2010/0299865 A1 | 12/2010 | Conrad | |
| 2010/0299866 A1 | 12/2010 | Conrad | |

FOREIGN PATENT DOCUMENTS

| | | |
|---|---|---|
| EP | 0 284 675 A1 | 10/1988 |
| EP | 0 424 079 A | 4/1991 |
| EP | 0 928 594 A1 | 7/1999 |
| GB | 716 383 A | 10/1954 |
| JP | 50-083866 | 7/1975 |
| JP | 3-135461 | 6/1991 |
| JP | 2000-157463 A | 6/2000 |
| JP | 2004-121722 A | 4/2004 |
| JP | 2004-129783 A | 4/2004 |
| JP | 2005-103251 A | 4/2005 |
| WO | WO 01/17688 A | 3/2001 |
| WO | WO 2009/026709 A1 | 3/2009 |

OTHER PUBLICATIONS

Office Action for EP 07732072.9 mailed Jul. 1, 2011.

* cited by examiner

PARTICLE SEPARATOR

This invention relates to particle separators for use, for example, in a household vacuum cleaner of the so-called "bagless" type.

Bagless vacuum cleaners separate particulate matter from an air stream entraining such particles by subjecting the air stream to a vortex in a centrifugal separator either of the centrifugal or swirl tube type, dust and other dirt particles settling under gravity for collection and disposal as the air stream loses its velocity and is exhausted to atmosphere in a relatively clean state.

Known household vacuum cleaners of the type described, while avoiding the problems of filters and bags (which, in use, become clogged with particulate matter and thus rapidly impair the flow rate through the cleaner) nevertheless have attendant disadvantages in that they can generally only capture particles larger than 5 microns in diameter and that there tends to be an element of re-entrainment of some particulates in the exhaust airflow, thus again contributing to a loss of efficiency. In known apparatus, these problems are exacerbated by turbulence induced in the entraining air stream, especially by vanes or other deflectors which are used to create rotary motion in the particle-laden air stream. In an attempt to avoid such disadvantages, conventional apparatus often uses a tangential inlet tube with the object of increasing the rotational velocity of the incoming air stream, and hence the centrifugal force acting on the particles entrained therein, as the air stream is constrained in a pathway of decreasing diameter on making the transition from the inlet to the centrifugal separator. Nevertheless, known apparatus still suffers from disadvantages associated with failure to achieve a clean cut between de-entrained particles and exhaust air.

In one aspect, the present invention provides apparatus for separation of particles from a fluid stream entraining said particles, the apparatus comprising an inlet zone, a centrifugal separation zone, particles collection means and exhaust means, in which the inlet and separation zones are in communication via a transition zone for inducing vortical flow in the fluid stream, the transition zone having a diameter greater than the diameter of the inlet zone and comprising means defining an outlet port to the separation zone, an entry port being formed in the transition zone upstream of the baffle means, the entry and outlet ports being mutually arranged to minimise fluid perturbation in the fluid stream in use.

In this specification, a zone having a particular function is to be understood to be a part of the apparatus defined by a boundary wall and being constructed and arranged to perform that function.

Apparatus according to the invention may comprise coaxial inlet, transition and centrifugal separation zones, in which the inlet zone has a diameter less than the diameter of the transition zone, whereby particles-laden fluid entering the transition zone from the entry port is induced to follow a vortical pathway having a greater or more expansive diameter than that of the inlet zone before passing to the separation zone. However, the inlet zone (or a plurality of inlet zones) may be axially parallel with but offset from the transition and separation zones, but preferably disposed to be within the region defined by and extending in an upstream direction from the outer wall of the separation zone. In another arrangement, the inlet zone is tangential to the separation zone, the transition zone including a curved pathway of decreasing radius to increase the radial component of the velocity of the particles before entry thereof to the separation zone.

Preferably, the entry and outlet ports are of substantially the same cross-sectional area to minimise fluid perturbation in use. By "substantially the same cross-sectional area" is meant that the outlet port to the separation zone is either the same in area as the entry port to the transition zone or, if different therefrom, is preferably larger but by no more than 20%, preferably no more than 10%, larger than the area of the entry port.

Where the inlet, transition and centrifugal separation zones are coaxial or axially in parallel, the means defining the outlet port from the transition zone to the separation zone preferably comprises a baffle means disposed across the inlet zone and partially separating the transition and separation zones, thereby defining the outlet port to the separation zone, and the entry port comprises a cut-away side portion of the wall of the inlet zone giving access to the transition zone. Where the inlet zone is tangential to the separation zone, the means defining the outlet port may comprise a baffle means disposed partially to separate the transition and separation zones and the entry port is defined by the lumen of the wall of the inlet zone as it assumes a curved pathway to become the transition zone. However, in such an arrangement, a baffle means is not essential for the purpose of inducing vortical flow and the outlet port to the separation zone may comprise a notional port region between the transition and separation zones, such zones being in open communication.

It has surprisingly been found, according to the invention and despite the fact that the incoming fluid stream experiences a transition from an essentially linear to a vortical flow, that nevertheless there is less flow disruption, turbulence and reduction in separation efficiency than is experienced in known apparatus. Indeed, overall, apparatus according to the invention operates at high efficiency with a low pressure drop for particulates having a wide range of particle size and density.

The vortical motion-inducing transition zone may comprise, as between the inlet and centrifugal separation zones, a scroll entry port of a known configuration but, in effect, applied in inverse relationship from conventional apparatus. Conventional scroll configurations are applied to tangential outlets to centrifugal separation apparatus and include 90%, 180%, 270% and 360% scrolls and logarithmic spiral scrolls. In apparatus according to the present invention and especially where the inlet and separation zones are coaxial or axially in parallel, rotary motion is induced by the scroll entry port and in the transition zone but commences upstream of the transition zone, in the downstream end region of the inlet zone, thereby enabling particulate matter entrained by the fluid stream to be moved towards the bounding wall of the inlet zone as a pre-separation step before entering the transition zone through the scroll entry port.

Preferably, the centrifugal separation means are also coaxial at least with the exhaust means and preferably also with the collection means. The particles-laden fluid stream, once within the centrifugal separation means, describes a helical pathway to the far or distal end, in which the particles are moved under centrifugal force towards the peripheral regions of the separation means and passed therefrom to the collection means through port means communicating between the separation and collection means. The centrifugal separation means may be tapered to provide a frusto-conical chamber and to induce acceleration of the airstream, and thus more efficient separation of particulates, towards the distal end. The fluid then passes back down the centre of the separation means in a helical pathway and enters the finder of the exhaust means. In apparatus according to the invention, the particles are thus separated from the fluid in a region remote from the flow of fluid towards the exhaust means, thereby significantly reducing re-entrainment of particles.

Optionally, the exhaust means extends to the proximal end of the separation means and is in communication therewith through an array of slots or other apertures formed in the wall of the exhaust means. The slots or other apertures may be radially formed through the wall of the exhaust means but, preferably, are formed at an angle in the direction of fluid flow, in order to improve efficiency and reduce back pressure. The slots or other apertures can extend along the exhaust means from the upstream or proximal end of the separation means for up to approximately 90% of the distance to the downstream or distal end of the separation means. In other embodiments, the exhaust means comprises an open-ended tube which is spaced from the proximal end of the separation means. The exhaust means may extend from the remote end of the apparatus (with respect to the inlet means) but alternatively, especially where the inlet means are axially offset from the separation means, may extend from the same end as the inlet means.

The particle collection means, which preferably surrounds at least the centrifugal separation means, may be formed with a removable base for the purpose of disposal of collected particulates or, alternatively, with an access door with suitable seal. Alternatively, the collection means may be removable together with the inlet and separation means, collected particles being thereafter removable therefrom. The particle collection means is constituted by a separate chamber from the separation zone, whereby the amount of particles collected has little or no effect on the separation efficiency, since there is significantly less air movement in the collection chamber with corresponding less tendency for re-entrainment of separated material.

In a preferred arrangement and in order to prevent trapping of particulates in the zone between the inlet and centrifugal separation zone, the base of the transition zone may be formed as a helix to ensure that all particles remain entrained in the fluid stream without becoming trapped.

In apparatus according to the invention, the arrangement of the component parts may be such that the direction of fluid flow in the inlet zone, separation zone and exhaust means is in counter-current to the direction of settlement of particles in the collection means, which takes place under the influence of gravity as kinetic energy is lost in the separation zone or, alternatively, such that the directions of fluid flow and settlement of particles are the same.

In another aspect, the invention provides a method for separation of particles from a fluid stream entraining said particles, the method comprising passing said stream is essentially linear flow through apparatus comprising an inlet zone and a centrifugal separation zone, in which the stream passes through a transition zone between the inlet and separation zones to induce a vortical flow pathway in the separation zone with minimal fluid perturbation in passing through the transition zone.

Embodiments of the invention will now be described by way of example with reference to the accompanying drawings, of which:

Figure 1:
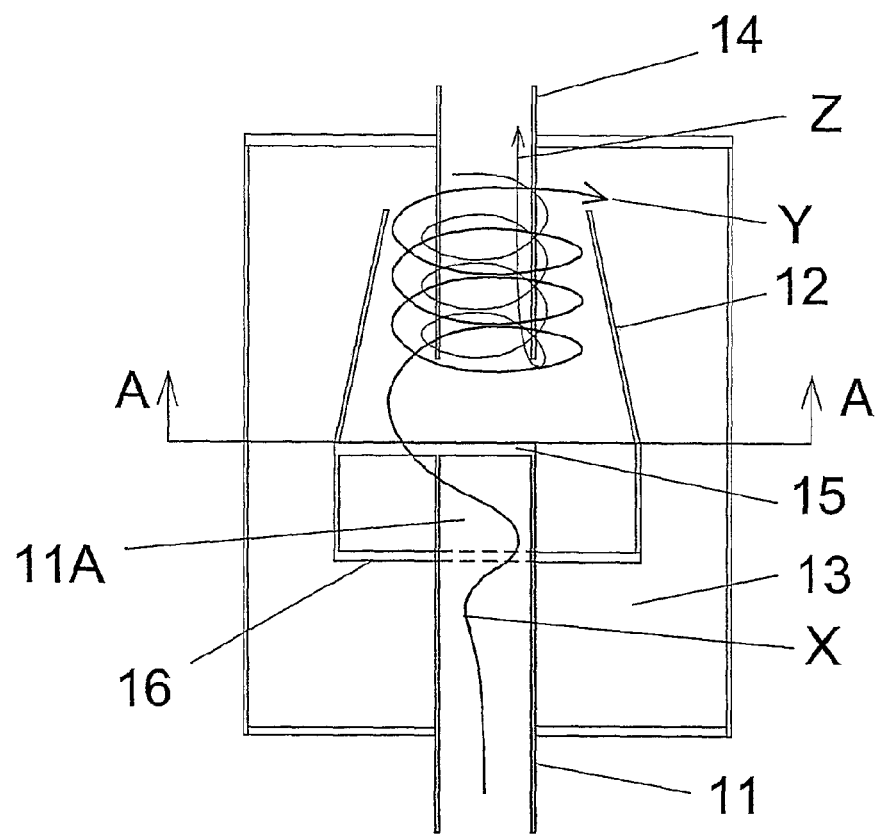
FIG. 1 shows, diagrammatically, a side view of an embodiment in which fluid flow is generally in an upwards direction.
Figure 2:
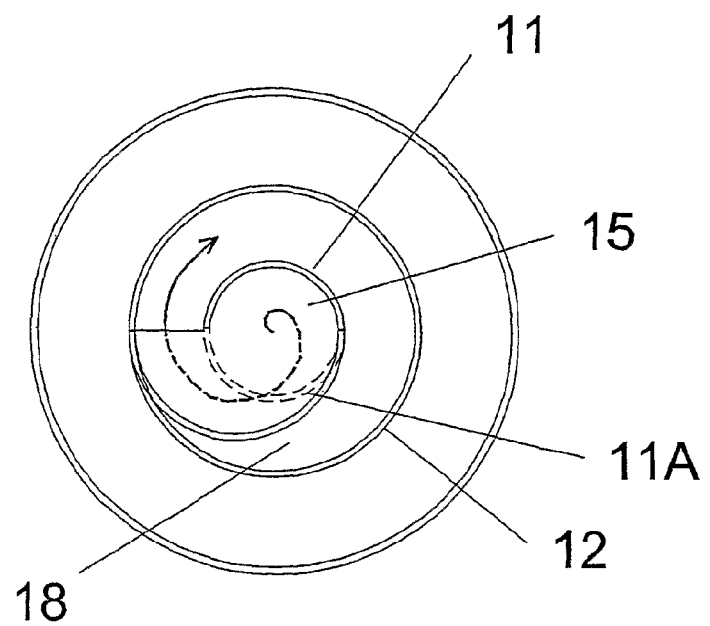
FIG. 2 is a plan view on the line A-A of FIG. 1.

Referring firstly to FIGS. 1 and 2, the apparatus consists essentially of an inlet tube 11, a frusto-conical separation chamber 12, a collection chamber 13 and an exhaust duct 14. The parts 11, 12, 13 and 14 are arranged concentrically. The upper end of the inlet tube 11 is formed with a closure or baffle plate 15 which constitutes the effective lower end or base of the separation chamber, although the lower end of the cylinder which forms the separation chamber extends downwardly below the plate 15 to a lower wall 16. The plate 15 closes the upper end of the tube 11 and extends partially over the annular space defined between the tube 11 and chamber 12, as shown in FIG. 2, to define an access or inlet port providing a pathway for fluid between the inlet tube and separation chamber. In the transition zone between the plate 15 and the lower wall 16, the tube 11 has an exit or outlet aperture 11A which, in combination with the plate 15, induces a vortical motion in fluid flowing up the tube 11 and into the chamber 12, the fluid flow being illustrated by the heavy solid line X. The cross-sectional area of the exit or outlet aperture is the same as that of the access port.

In use, particulate matter entrained in the fluid flow is urged towards the outer periphery of the chamber 12 and, at the upper end of chamber 12, the particulate matter is urged by centrifugal force into the annular space defined between the chamber 12 and the collection chamber 13, as indicated at Y. The fluid, then relatively free of particulate matter and having lost a component of its kinetic energy, returns down the chamber 12, adjacent the wall of the outlet tube 14, and enters therein for escape to atmosphere, as indicated by the light-solid line Z. The particulates fall under gravity to the bottom of chamber 13 for subsequent removal.

Figure 3:
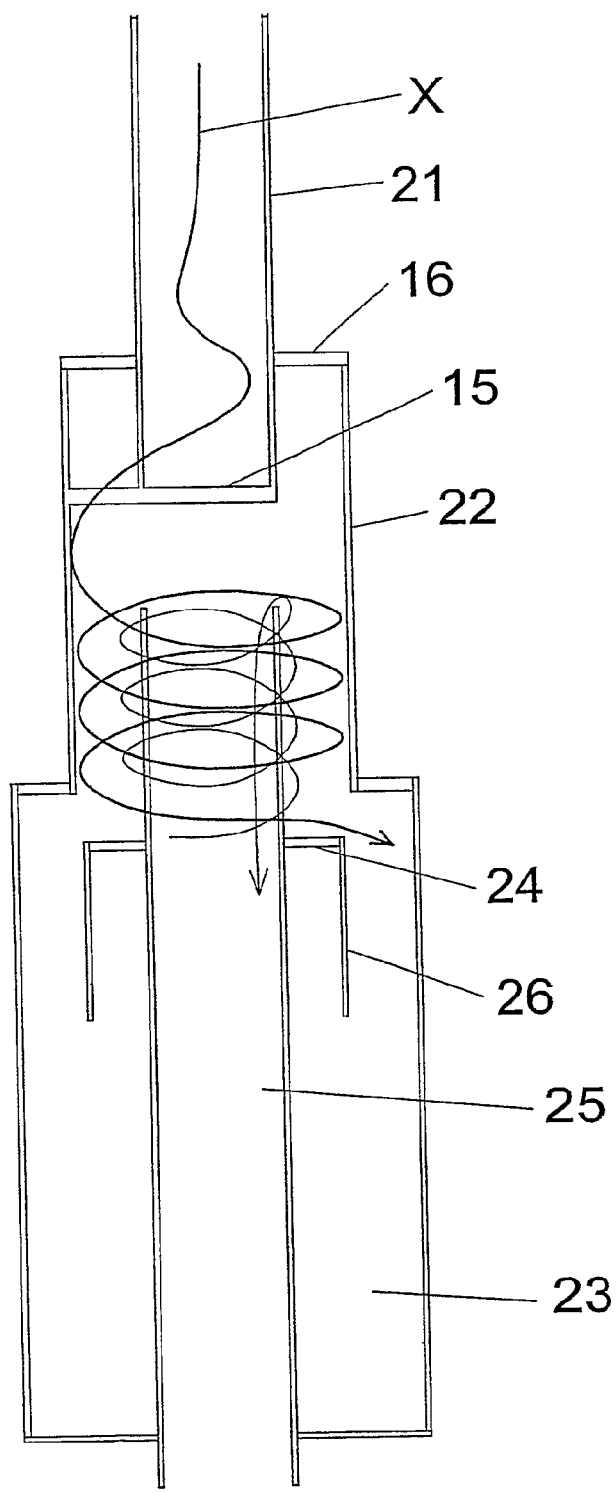
FIG. 3 illustrates diagrammatically an embodiment in which fluid flow is generally in a downwards direction.

With reference to FIG. 3, an alternative embodiment is illustrated which operates on a similar principle to the apparatus as illustrated in FIG. 1 but with the incoming fluid particulates-laden stream entering from above through tube 21 and being induced to follow vortical motion in separation chamber 22, which in this embodiment is cylindrical. Separated particulates are collected in collection chamber 23, an annular flange 24 being preferably provided around exhaust chamber 25 to encourage the fluid stream, relatively free of particulates, to return upwards to enter the upper end of the exhaust tube, bearing in mind that the fluid stream is inhibited from doing so in any event since the collection chamber 23 represents a closed system. In order to facilitate separation and collection of lighter, typically fibrous, material which, otherwise, may be re-entrained and expelled to atmosphere with the exhaust air, a collar 26 may be attached to the flange 24 in a downwardly-depending fashion; such a collar has been found significantly to improve retention of especially lighter particulates without materially affecting the retention volume provided by the collection chamber, since some collected material is held within the inverted cup-shaped space created by the collar and flange. In addition, the presence of stationary material in this region has also been found to enhance the stabilisation and to reduce the motion of incoming particulate material, thus again contributing to improved retention efficiency.

In the embodiment as shown in FIG. 3, exhaust air, substantially free of particulates, passes downwardly through exhaust tube 25.

Figure 4:
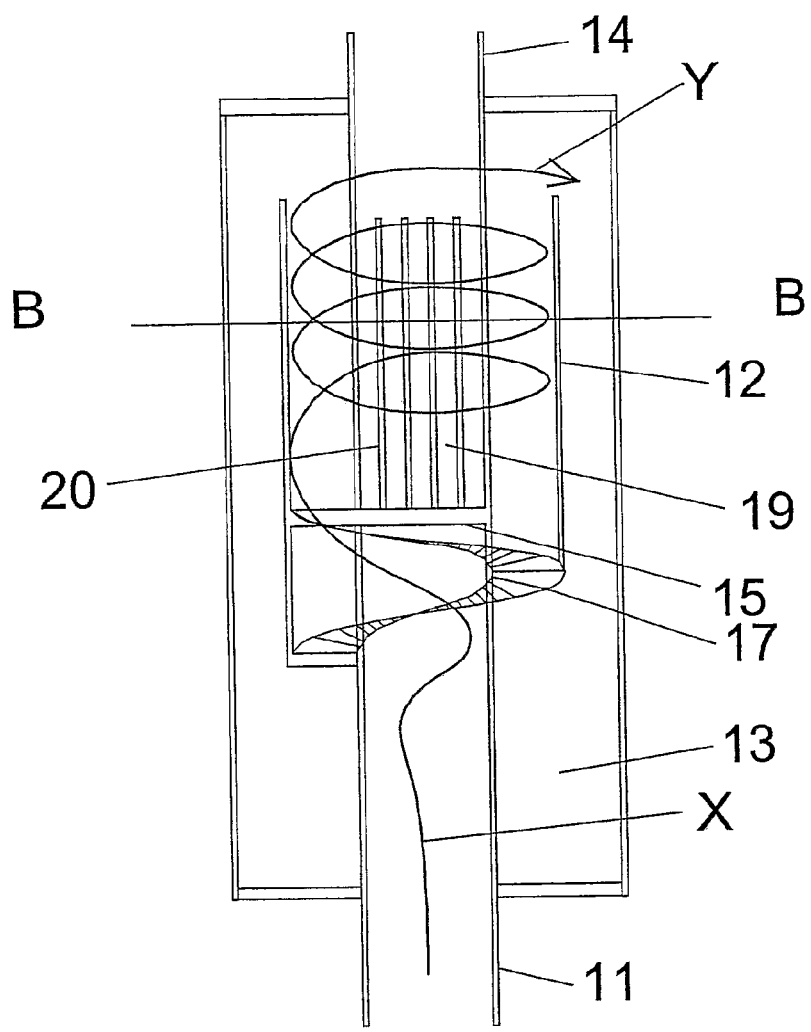
FIG. 4 shows diagrammatically a side view of a variation of the apparatus as shown in FIG. 1.
Figure 5:
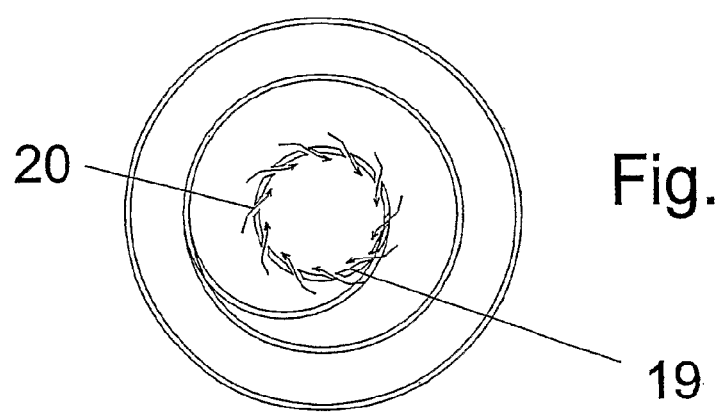
FIG. 5 shows a plan view of the apparatus of FIG. 4.

With reference now to FIG. 4, an embodiment similar to that described with reference to FIGS. 1 and 2 is illustrated and the same reference numerals are used to depict the same functional component parts. However, in the embodiment of FIG. 4, the base 16 of the separation chamber 12 is replaced with an annular helical track 17, to prevent particulates becoming trapped in the blind end represented by 18 in FIG. 2, and the exhaust tube 14 of FIG. 1 is, in FIG. 4, extended downwardly in contact with plate 15, an array of vertically-disposed vanes or louvres 19 defining between them gaps 20 for ingress of exhaust air. As shown in FIG. 5, the vanes are preferably provided with angled edges so that the resulting slots 20 enable access of exhaust air substantially without the creation of unwanted back pressure.

Figure 6:
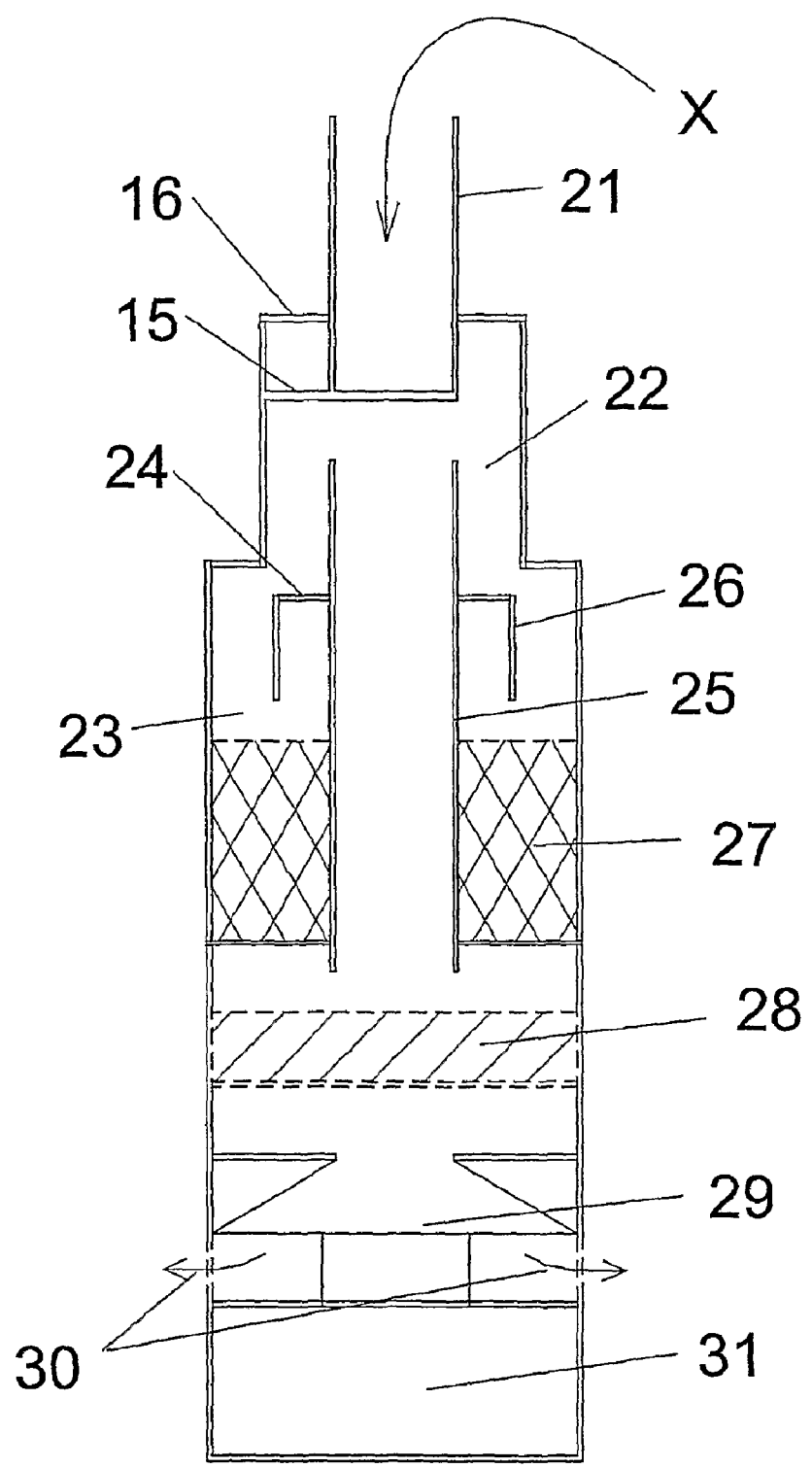
FIG. 6 shows a variation of the FIG. 3 embodiment adapted to a vacuum cleaner.

FIG. 6 illustrates an embodiment similar to that described with reference to FIG. 3, particularly adapted for use in a self-contained vacuum cleaner unit. The same reference numerals are used for FIG. 6 as are used in FIG. 3 for corresponding parts. As with FIG. 3, particulates-laden fluid X enters at the upper end of the apparatus through tube 21 and is induced to follow a vortical pathway in separation chamber 22. Collected particulates 27 accumulate in the collection chamber 23. Exhaust air is then passed through a filter 28 to remove residual particulate matter; the filter 28 may be a relatively low-efficiency filter or a high-efficiency HEPA filter, depending on the level of filtration efficiency required. A motor unit and fan 29 is disposed below the filter unit 28 and thus draws air through the entire apparatus, exhaust air passing out through suitably-configured orifices 30. A rechargeable battery unit 31, with appropriate charging electronics and connections, may be disposed below the orifices 30 or, alternatively, for a mains-powered apparatus, a mains operated motor and fan may be utilised. The apparatus may be suspended either from a carrying handle attached for example to a shoulder strap, thus making a stable and portable unit, or otherwise adapted for travel on the floor.

Figure 7:
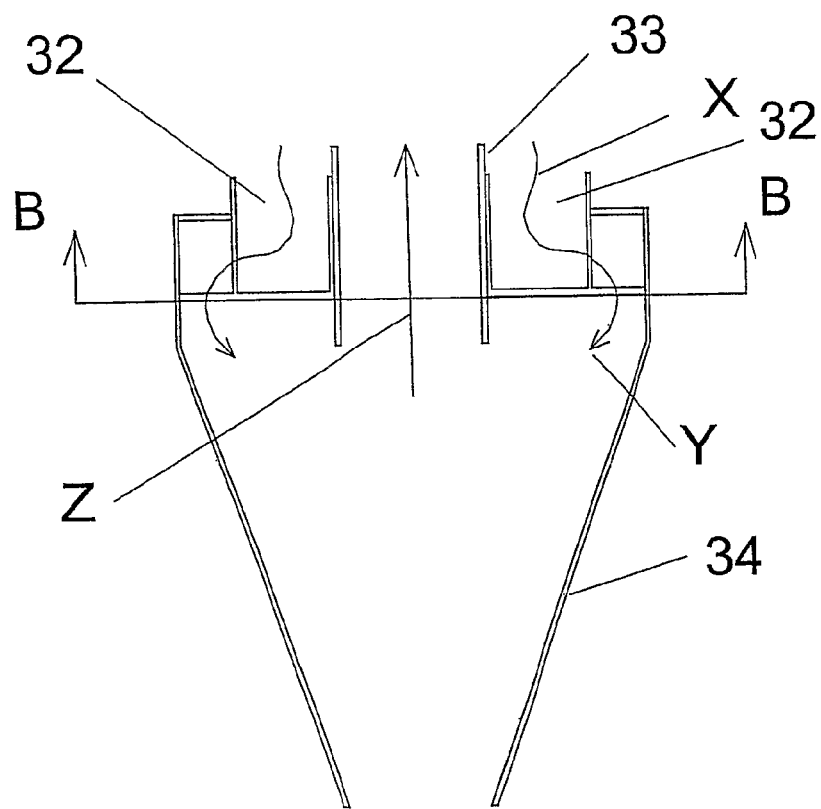
FIG. 7 shows a side view of an embodiment in which exhaust flow is from the same end of the apparatus as the inlet flow.
Figure 8:
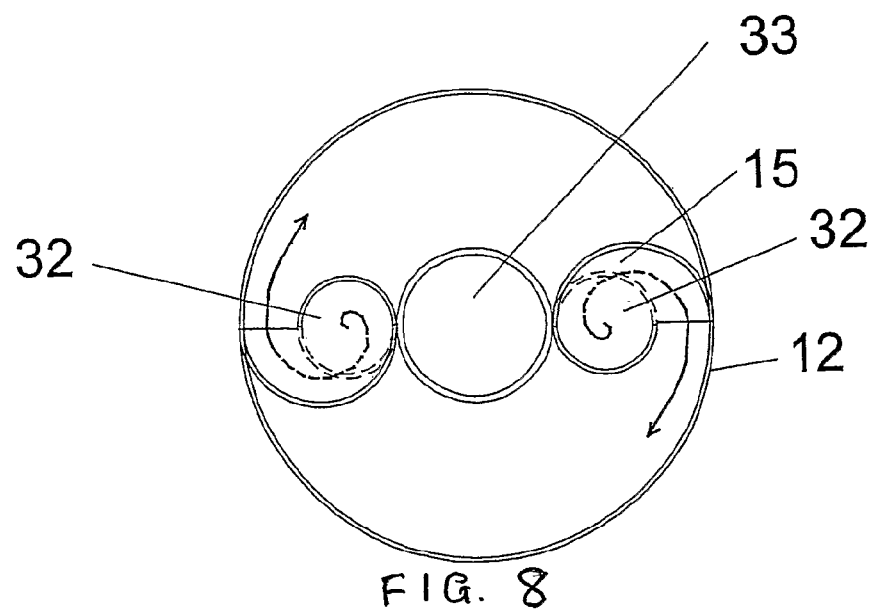
FIG. 8 is a plan view on the line B-B of FIG. 7.

With reference to FIGS. 7 and 8, the apparatus includes two inlet tubes 32 disposed diametrically opposite each other and on either side of exhaust duct 33. The separation chamber 34 is frusto-conical and particulates pass through the lower open end thereof for collection. As with FIG. 1, the direction of incoming particulates-laden air through the transition zone is shown by X, separation of particulates by Y and exhaust air by Z.

Figure 9:
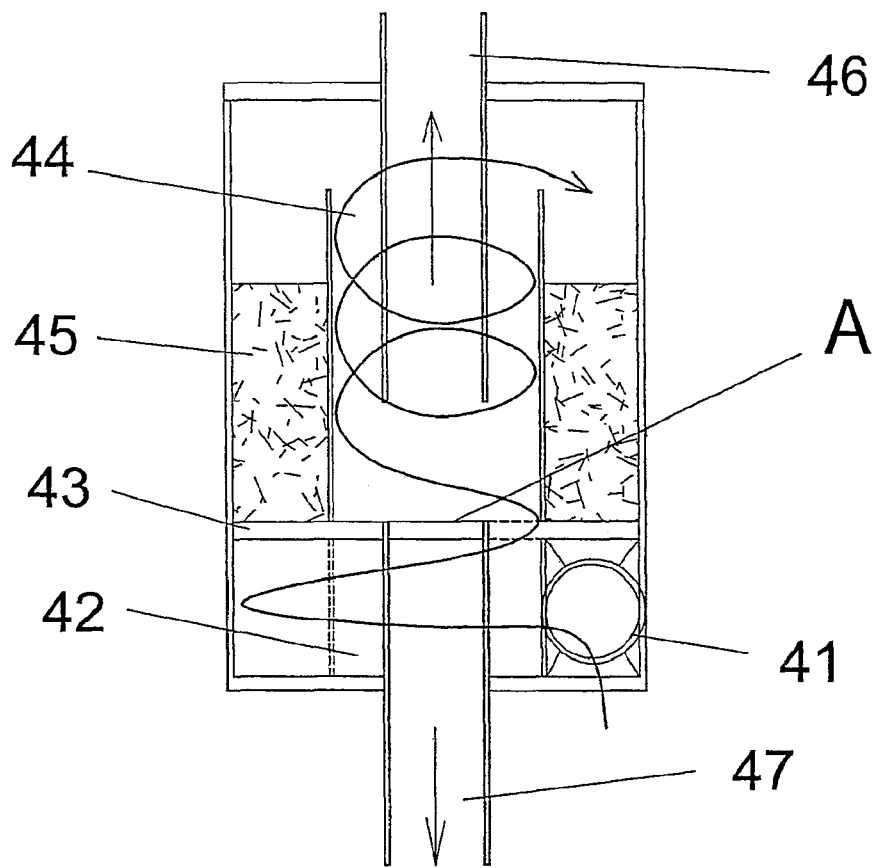
FIG. 9 shows diagrammatically a side view of apparatus having a tangential inlet zone.
Figure 10:
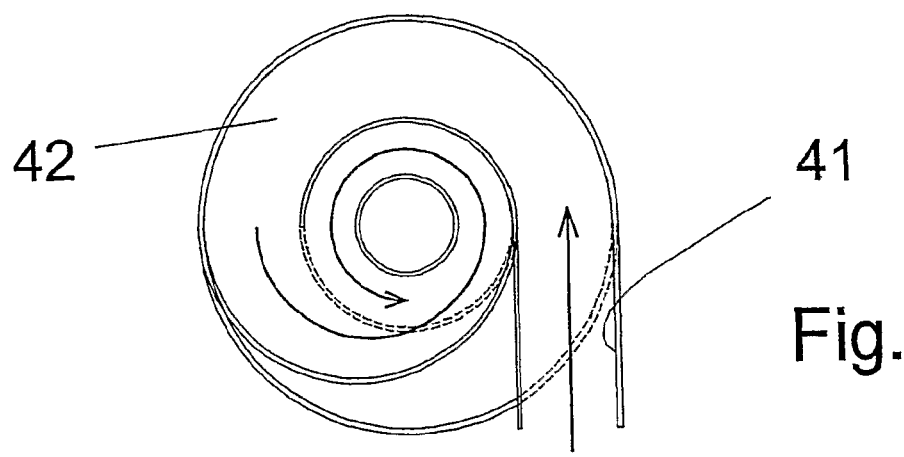
FIG. 10 is a plan view of the apparatus of FIG. 9.

Referring to FIGS. 9 and 10, the apparatus has a tangential inlet pipe 41 which enters a transition zone defining a circular pathway 42 of decreasing radius, whereby incoming air is constrained to move along the pathway to experience a continual and increasing radial acceleration over an increased path length, compared with previously described embodiments. The airstream then passes through an opening formed in baffle plate 43 to the separation chamber 44. Particles 45 are collected in an annular collection chamber and exhaust air leaves the apparatus through exhaust duct 46. In an alternative configuration, the apparatus may be adapted to reverse-flow operation by including exhaust duct 47 with removal of the central part of baffle plate 43, indicated "A" in FIG. 9 and blocking or removal of exhaust duct 46, whereby exhaust air passes through duct 47. In this arrangement and because the incoming airstream is induced to follow a vortical flow in pathway 42, the baffle plate 43 may be omitted, the air passing freely to the separation chamber 44 through an open circular or annular region, according to whether the apparatus includes duct 47.

Figure 11:
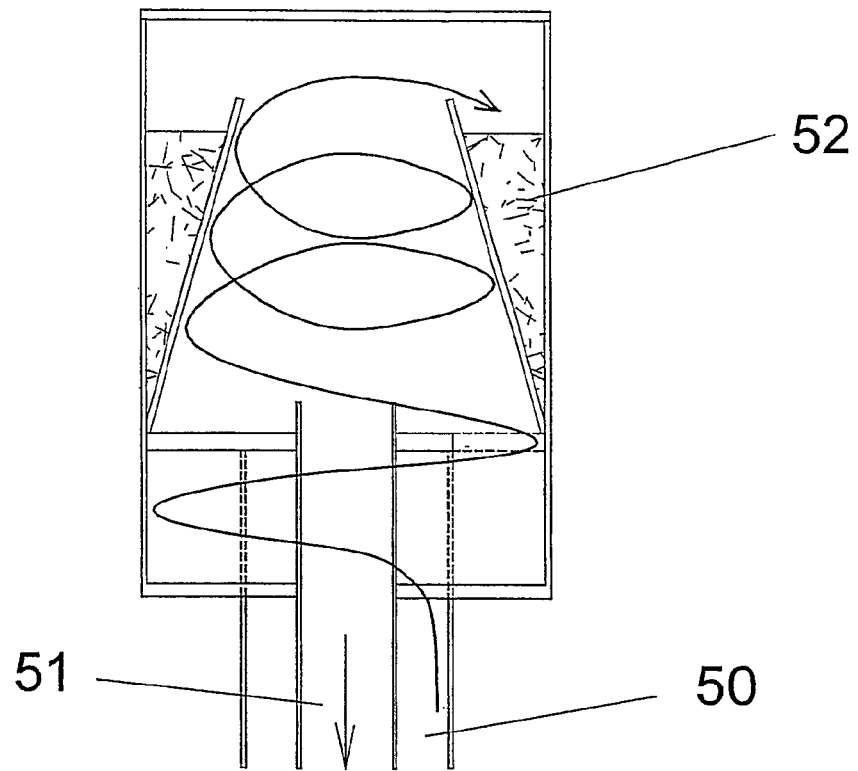
FIG. 11 shows diagrammatically a side elevation of apparatus with a reverse-flow coaxial arrangement of inlet and outlet zones.
Figure 12:
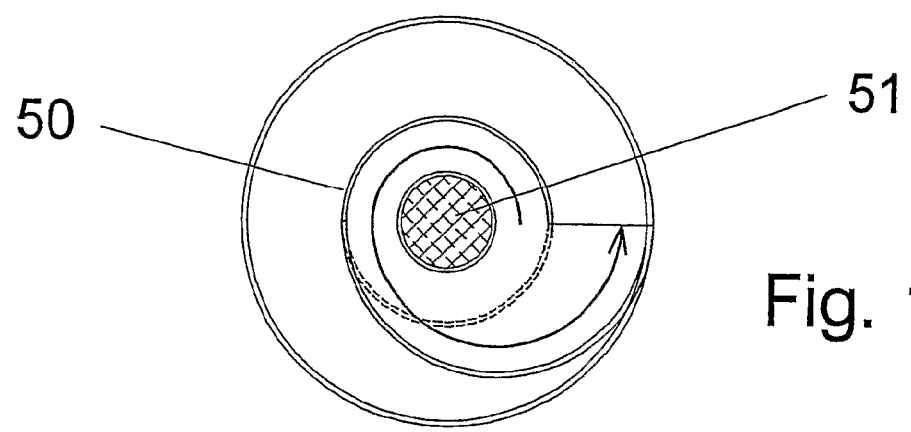
FIG. 12 is a plan view of the apparatus of FIG. 11.

Referring to FIGS. 11 and 12, a reverse-flow coaxial arrangement of inlet and outlet ducts is shown with the inlet tube 50 surrounding the outlet tube 51, the overall arrangement being similar to that described with reference to FIGS. 1 and 2 but showing a counter current configuration. However, compared with FIGS. 1 and 2, the central part of the baffle plate 15 is absent in the apparatus as illustrated in FIGS. 11 and 12, in which the use of a standard inverted cyclone arrangement is possible with both inlet and outlet conveniently disposed at the lower end next to each other. It is also possible to use a cylindrical separator section in place of the frusto-conical section shown, provided that the dimensions of the collection chamber 52 are selected accordingly.

Although the invention has been described with particular reference to vacuum cleaners, in which the fluid is air, the invention may also be applied to other applications such as spark arrestors in automotive exhausts, also where the fluid is gaseous, or where the fluid is water or other liquid.

The invention claimed is:

1. A method for separating particles from a fluid stream, the method comprising:
    (a) passing the fluid stream in essentially linear flow through an apparatus having an inlet zone and a centrifugal separation zone;
    (b) passing the fluid stream through a transition zone between the inlet and separation zones to induce a vortical flow pathway in the separation zone with minimal fluid perturbation when passing through the transition zone; and
    (c) collecting the particles separated from the fluid stream in a collection zone circumferentially surrounding the separation zone.

2. A particle separator for separating particles from a fluid stream, comprising:
    a separation container having a first end and an opposed second end;
    a separation chamber having an inlet end and an outlet end in the separation container and having a dimension less than the separation container;
    a collection chamber circumferentially surrounding the separation chamber;
    an inlet duct extending from outside the separation container into the first end of the separation container for introducing the fluid stream into the separation chamber and adapted to introduce helical flow in the fluid stream;
    an exhaust duct extending from within the separation chamber to outside the opposed second end of the separation container;
    wherein the fluid stream leaving the inlet duct travels in helical flow around the exhaust duct to the outlet end of the separation chamber and flows out the exhaust duct; and
    as the fluid stream changes direction particles in the fluid stream are urged outside the separation chamber and collected in the collection chamber.

3. The particle separator of claim 2, wherein the separation chamber is substantially cylindrical.

4. The particle separator of claim 2, wherein the inlet and exhaust ducts are coaxial.

5. The particle separator of claim 2, wherein the exhaust duct is substantially tubular.

6. The particle separator of claim 2, wherein the inlet and exhaust ducts are of substantially the same cross-sectional area.

7. The particle separator of claim 2, wherein the inlet duct enters the separation container at the first end and the exhaust duct exits at the opposite second end.

8. The particle separator of claim 2, wherein the inlet and outlet ducts are at the same end of the separation container.

9. The particle separator of claim 2, wherein the inlet duct feeds the fluid stream into the separation chamber tangential to an inner wall of the separation chamber.

10. The particle separator of claim 2, wherein an inlet portion of the exhaust duct in the separation chamber includes a plurality of apertures.

11. The particle separator of claim 10, wherein the apertures are longitudinal slots.

12. The particle separator of claim 2, wherein the separation chamber is substantially conical.

13. The particle separator of claim 12, wherein the separation chamber is frusto-conical in shape.

14. The particle separator of claim 12, wherein the separation chamber is an inverted cone.

15. An apparatus comprising:
- a container for separating particles from a fluid stream, the container having a first end and a second end;
- a separation chamber having an inlet and an outlet, the separation chamber having a dimension less than the container;
- a collection chamber circumferentially surrounding the separation chamber;
- an annular space between the separation chamber and the collection chamber;
- an inlet duct extending from outside the container into the first end of the container for introducing the fluid stream into the separation chamber, the inlet duct configured to introduce helical flow in the fluid stream;
- an outlet duct extending from within the separation chamber to outside the second end of the container;
- wherein the fluid stream leaving the inlet duct enters the separation chamber via the inlet, travels in helical flow around the outlet duct to the outlet of the separation chamber, and flows out the outlet duct; and
- as the fluid stream changes direction particles in the fluid stream are urged outside the separation chamber into the annular space and collected in the collection chamber.

16. The apparatus of claim 15, wherein the separation chamber is substantially cylindrical.

17. The apparatus of claim 15, wherein a portion of the outlet duct in the separation chamber includes a plurality of apertures.

18. The apparatus of claim 15, wherein the inlet duct enters the container at the first end and the outlet duct exits the container at the second end thereof, the second end opposite the first end.

19. The apparatus of claim 15, wherein the inlet and outlet ducts are at the same end of the container.

20. The apparatus of claim 15, wherein the inlet duct feeds the fluid stream into the separation chamber tangential to an inner wall of the separation chamber.

* * * * *